April 4, 1961 — H. J. SCHULTE, JR — 2,978,680

PRECESSION STORAGE DELAY CIRCUIT

Filed Dec. 6, 1957

INVENTOR
H. J. SCHULTE, JR.
BY Alan C. Rose
ATTORNEY 2,978,680

PRECESSION STORAGE DELAY CIRCUIT

Harry J. Schulte, Jr., Whippany, N.J., assignor to Bell Telephone Laboratories, Incorporated, New York, N.Y., a corporation of New York Filed Dec. 6, 1957, Ser. No. 701,259
5 Claims. (Cl. 340—172.5)

This invention relates to digital data processing circuits and more specifically to memory or storage control circuits.

In digital computers or data processing equipment, it is often difficult to obtain desired information from different locations at the proper instant. Thus, for example, if large amounts of digital information are stored in two or more long acoustic delay lines, it may not be easy to obtain desired information at the output of two of the different delay lines for prompt use by the associated data processing circuitry. To circumvent this difficulty, many systems have utilized a number of short delay loops to hold information so that it is readily accessible. However, this solution to the problem is moderately costly, as it requires a large number of electrical delay circuits and access circuitry of considerable complexity.

A primary object of the present invention is the reduction in cost and complexity of dynamic storage systems.

In accordance with the invention, digital information in a delay loop may be shifted with respect to a standard time frame of reference by opening the delay loop at two spaced points, and immediately closing each of the two resulting sections of the delay loop on itself. After the information has circulated for a desired interval, the two sections are switched back to form a single complete loop. It should be noted that these switching operations take place without the loss of any digital information, and without the use of any extra delay circuitry.

By way of example, reference and procession loops including the same amount of delay may be employed, and the precession delay loop may include two sections. One of the sections of the precession delay loop may be an acoustic delay line having a large digital capacity, and the other section may be a relatively short electrical delay line external to the acoustic delay line. Switching circuits are provided for opening the precession loop at two spaced points, and for forming separate delay loops including the acoustic delay line and the electrical delay line. When the electrical delay line is closed on itself, selected groups of digits may circulate through it for several cycles. Then, when the short electrical delay line is reconnected in a series loop with the acoustic line, the selected groups of digits may be shifted in order with respect to the digital information circulated in the acoustic line. Alternatively, the selected groups of digits may be reinserted at the same point in the entire sequence of circulating digital information, with the result that the entire sequence of information in the precession loop is shifted in time with respect to the information in the reference delay loop.

Two illustrative examples of applications of the circuitry described in the preceding paragraph will now be set forth. It is often desirable that a computer perform a number of related problems simultaneously. In the context of the system described in the preceding paragraph, intermediate solutions relating to different parallel problems are stored in various time slots of the reference delay loop. Successive groups of input signals for each problem are stored in various time slots of the precession delay loop. As the parallel computation proceeds, it is necessary to make available the successive portions of the input information associated with each problem at the output of the precession loop simultaneously with the arrival of the intermediate solution at the output of the reference delay loop. This is accomplished by the actuation of the precession circuitry to shift all of the information in the precession circuitry by a predetermined amount. Following this shift, the new portion of the input information for each problem is available for use with the intermediate solution. The input information which has already been employed is retained for future reference. For operation in this mode, the precession circuit is operated to insert the selected information back in the same relative position in the precession delay loop.

Another application of the precession delay loop circuitry involves the sorting of digital words. The words in the precession delay loop may be sorted by the selection of successive words and the comparison of each selected word with the previously sorted words in the remainder of the precession delay loop. Access circuits for both of the two shorter delay loops which are derived from the precession delay loop are required for this application. It has further been determined that the amount of time required for complete sorting of the words in the precession delay loop is approximately equal to the number of words multiplied by the delay in the precession delay loop.

In accordance with a feature of the invention, a main delay loop includes two delay sections, and switching circuitry is provided for selectively opening the main delay loop and closing each of the two delay sections on themselves to form two separate delay loops.

In accordance with an additional feature of the invention, a reference delay loop and a precession delay loop are operated synchronously, the precession delay loop includes first and second portions, and circuitry is provided for opening the precession loop and for closing each of said first and second portions on itself.

In accordance with a further feature of the invention, a data processing circuit is coupled to transmit information to and receive information from preassigned points in the reference and precession loops of the circuits described in the preceding paragraph.

Advantages of the invention include the full utilization of the storage delay line capacity of the system at all times, and the resulting low cost of a nondestructive digital information shifting arrangement.

A complete understanding of this invention and of these and various other features thereof may be gained from consideration of the following detailed description and the accompanying drawing, in which.

Figure 1:
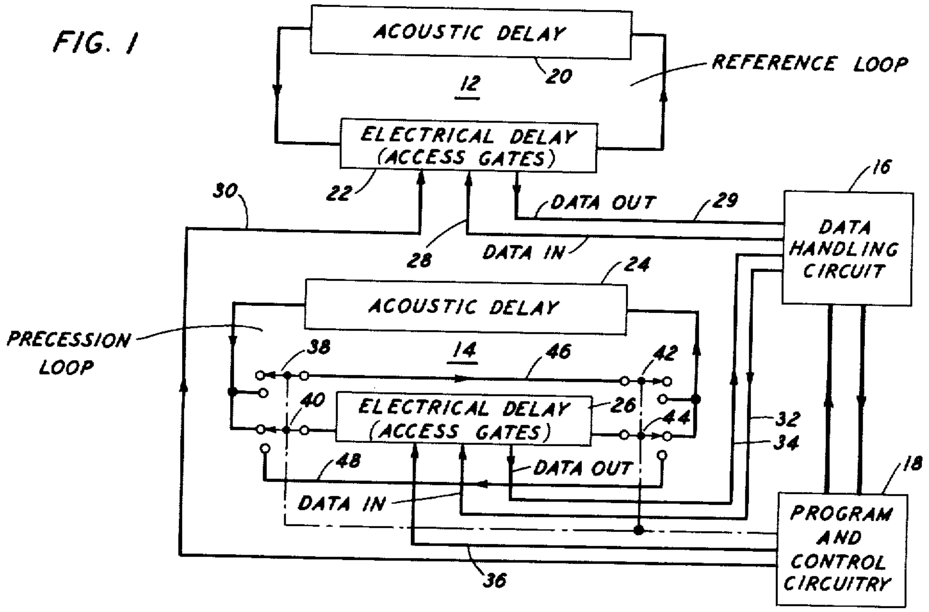
Fig. 1 is a block diagram of an illustrative embodiment of the invention.

In the illustrative circuit of Fig. 1, a reference delay loop 12 and a precession delay loop 14 are provided. These delay loops provide storage for the data handling circuit 16, which may, for example, be computing circuitries or other work circuits, and its associated control circuitry 18. The reference delay loop 12 includes a long acoustic delay line 20 and a short electrical delay line 22. In a similar manner, the precession delay loop 14 includes a long delay line 24 and a shorter electrical delay circuit 26. The use of delay loops such as are shown at 12 and 14 is broadly well known in the art.

The long acoustic delay lines 20 and 24 may be of quartz or mercury, for example. A typical system employing mercury delay lines is disclosed in volumes I and II of "A Functional Description of the EDVAC," University of Pennsylvania, Moore School of Electrical Engineering, Philadelphia, Pennsylvania, November 1, 1949. Data is supplied to and from the reference loop 12 via leads 28 and 29 under the control of signals applied from the control circuit 18 on lead 30. In a similar manner, signals are applied to and derived from the precession loop 14 on leads 32 and 34 under signals applied from the control unit 18 on lead 36. The acoustic delay units designated 20 and 24 normally represent inaccessible delay in that the signals applied to these acoustic delay units may not be recovered until they reach the output of the units. With pulse repetition rates of three pulses per microsecond, for example, and a relatively large quartz delay plate, several thousand binary digits, or "bits," may be stored in the inaccessible acoustic delay unit. Information is applied to and removed from the delay loops 12 and 14 through access gates associated with the electrical delay circuits 22 and 26. Suitable arrangements for transferring binary information to and from delay loops are disclosed in the EDVAC reference cited above, for example, and in J. G. Tryon, application Serial No. 474,659, filed December 13, 1954, now Patent No. 2,850,461, issued August 23, 1960.

For many purposes, it is desirable that the signals applied simultaneously on leads 29 and 34 from storage loops 12 and 14, respectively, to the circuit 16 include certain related information. In many data processing systems, additional storage loops are provided to store on a temporary basis information from one portion of one acoustic delay loop until desired related information appears at the output of another delay loop. In accordance with the present invention, I avoid the use of such extra delay loops through the use of switching circuits 38, 40, 42, and 44 located between the delay circuits 24 and 26 in the precession delay loop 14.

Under normal conditions, the switching circuits 38, 40, 42, and 44 are in the condition shown in Fig. 1, and pulses circulate around the delay loop 14 in the same time interval that is required for pulses to circulate around the delay loop 12. When it is desired to shift or precess information in delay loop 14 with respect to that in delay loop 12, the switching circuits 38, 40, 42, and 44 are shifted to the position indicated by the extra set of contacts in Fig. 1. Under these conditions, two delay loops are formed. The inaccessible delay circuit 24 is closed upon itself through the by-pass circuit 46, and the shorter electrical delay line 26 is also closed upon itself through lead 48. Suitable regeneration circuitry (not shown) is included at the input of both delay circuits. In addition to the delay introduced by input and output coupling and amplifying circuits, the delay unit 24 may include some electrical delay for padding and adjustment of electrical length.

When the switching circuit is in the precession state, the selected information in the electrical delay line 26 is circulated locally. The information in the long delay line 24 is also circulated, but it traverses its delay loop in a time which is slightly less than that required for information to traverse the reference delay loop 12. Following the expiration of a predetermined time interval, the switching circuit is returned to its normal state, and the selected information which had been circulated in the shorter delay loop including circuit 26 is now reinserted at any desired point in the information contained in the entire precession delay loop 14. A part or all of the information in the precession loop 14 is shifted in time with respect to corresponding information in the reference delay loop. Following this operation, desired related information stored in delay loops 12 and 14 may be routed simultaneously to the data handling circuit 16. Thus, through the use of the switching circuits described above, the storage delay capacity of the system is fully utilized at all times, and no additional delay loops are required.

By way of illustration, the circuit parameters may be mentioned for one specific illustrative embodiment of my invention in accordance with the arrangement shown in Fig. 1, but in which a computer having two reference delay loops and one precession loop is employed. The total delay of each of the three delay loops is sufficient to accommodate 318 groups of pulses, or words, each including 12 bits. The pulse repetition timing rate of the computer is 3,000,000 pulses per second. The acoustic delay is in the form of quartz plates. Five and one-quarter word periods of delay are external to the acoustic delay loop, and switching circuits such as those shown at 38, 40, and 42, 44 are spaced apart by three word periods of delay in the precession loop. With the arrangements as described above, closing the precession circuitry for 315 word periods results in the shifting of digital information in the precession delay loop by exactly three words periods with respect to the information circulating in the reference loops. It may also be noted that when the switching operation is completed, the selected three words of digital information are restored to the same relative order with respect to other digits in the precession delay loop.

The precession switching circuits may also be operated to shift the position of selected groups of words in the precession delay loop with respect to the remaining information in the precession delay loop. Thus, for example, closing the precession switching circuitry for three word periods results in shifting of the selected digital information by exactly three word periods in the complete precession delay loop. The relative positions of the selected three words in the shorter delay line and the three words which formerly followed the selected three words have now been interchanged. However, the positions of the remaining words in the precession delay loop are unchanged with respect to the corresponding information in the reference delay loops. Although only two specific examples have been considered above, it is evident that the selected information may be inserted at any desired point in the information in the precession delay loop by timely operation of the precession switching circuits.

Figure 2:
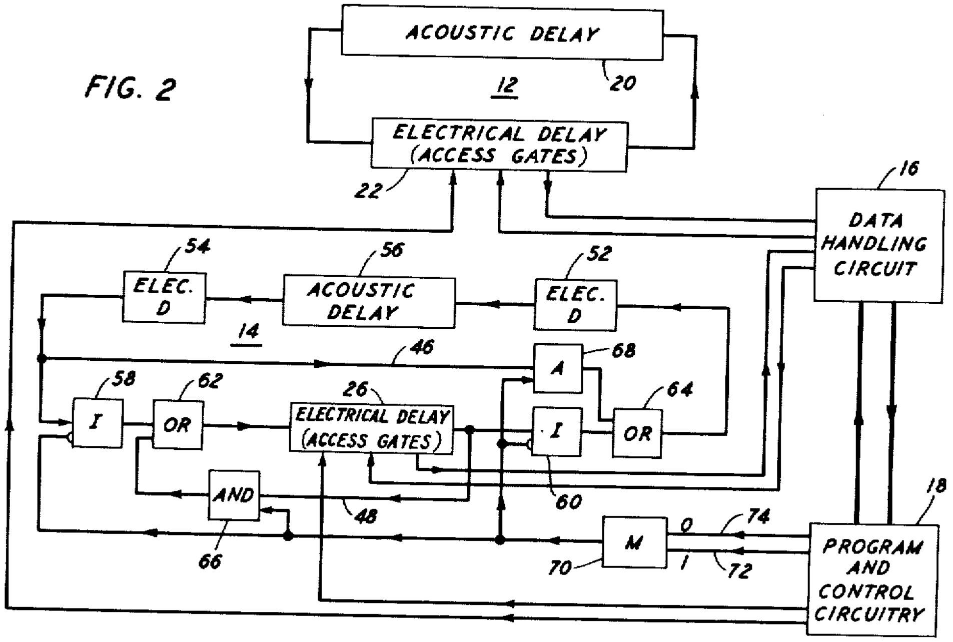
Fig. 2 is an additional block diagram of the circuit of Fig. 1 in which the logic switching circuitry is shown in greater detail.

The circuit of Fig. 2 is identical with that of Fig. 1, with the exception that the circuitry associated with the delay loop 14 is shown in somewhat greater detail. More specifically, in the circuit of Fig. 2 the switching arrangements are shown in terms of the logic circuits which are employed. These logic circuit elements may take any of many known forms. For example, they may be implemented in accordance with an article by J. H. Felker, entitled "Regenerative Amplifier for Digital Computer Applications," which appeared at pages 1584 through 1596 of the November 1952 issue of the Proceedings of the I.R.E., volume 40, No. 11.

Some of the logic building blocks which are employed include the AND unit, which produces output signals when all input leads are energized; the OR unit, which produces output pulses when any or all input leads are energized; and the inhibit unit, which has at least one normal input lead and an inhibiting input lead marked by a small semicircle at the point where it is connected to the block representing the inhibit unit. A pulse applied to a single normal input lead is transmitted through the inhibit unit while a pulse applied to the inhibiting input lead overrides other inputs and blocks output signals. A memory unit, as disclosed in the Felker article, may include an amplifier and a delay loop having one digit period of delay. The memory unit can be set to either the "0" state or the "1" state. When it is in the "0" state, no output pulses are produced; however, when it is in the "1" state, circulating pulses produce output pulses in successive digit periods until the memory unit is reset to the "0" state.

In the circuit of Fig. 2, the program and control circuit 18 provides the properly timed pulses in any desired digit period of any word period in the computer cycle. These control pulses may, for example, be obtained through the use of fast and slow speed ring counters, with the slow speed ring counter being advanced by one step for each count of the high speed ring counter. Coincidence circuits may be employed to derive pulses corresponding to any count of the high speed ring counter falling within any selected count of the slow counter. Normally, the fast ring counter is driven from a master timing or "clock" pulse source. As disclosed in the Felker article cited above, it is also conventional to employ master timing or "clock" pulses for pulse timing or regeneration in connection with many of the logic circuit components.

Now, with reference to the details of Fig. 2, the precession delay loop 14 includes the electrical delay line 26, additional electrical delay circuits 52 and 54, and the acoustic delay unit 56. The logic circuits which perform the function of the switching circuits 38, 40, 42, and 44 of Fig. 1 include the inhibit units 58 and 60, the OR circuits 62 and 64, and the AND circuits 66 and 68.

The precession switching circuitry is under the control of memory circuit 70, which is in turn enabled and disabled by pulses from the program circuit 18. Under normal conditions, with the memory circuit set to the "0" state, signals are circulated from the delay circuit 54 through the inhibit unit 58, the OR circuit 62, and the electrical delay line 26. From the output of the delay line 26, pulses are routed through the inhibit unit 60, the OR unit 64, and the two delay circuits 52 and 56 back to the delay circuit 54. Signals from the output of the electrical delay circuit 54 are also applied to lead 46. These signals are, however, blocked at the AND unit 68 by the absence of output pulses from the memory circuit 70. In a similar manner, output pulses on lead 48 from the electrical delay circuit 26 are blocked at the AND gate 66.

When the memory circuit 70 is set to the "1" state by a pulse from the program and control circuit 18 on lead 72, the precession switching circuitry is enabled. Under these conditions, pulses are applied from the output of memory circuit 70 to the AND circuits 66 and 68 and to the inhibiting input terminals of inhibit units 58 and 60. Pulses then circulate through a first delay loop including the electrical delay circuit 52, the acoustic delay unit 56, the additional electrical delay circuit 54, along lead 46, through AND unit 68 and OR unit 64, back to the electrical delay unit 52. A second shorter delay loop includes the electrical delay circuit 26, the AND circuit 66, and the OR circuit 62. These two delay loops correspond to the two loops formed from the precession loop 14 of Fig. 1 when the switching circuits 38, 40, 42, and 44 are operated to their precession states. Following the expiration of a predetermined time interval, a pulse is applied from the program and control circuit 18 on lead 74 to set the memory unit 70 to the "0" state. The delay circuits included in the precession circuit 14 are thereupon reconnected to form a single loop having a length equal to that of the reference loop 12.

It is to be understood that the above-described arrangements are illustrative of the application of the principles of the invention. Numerous other arrangements may be devised by those skilled in the art without departing from the spirit and scope of the invention.

What is claimed is:

1. In a digital data processing system, a reference storage loop, a precession storage loop, said precession storage loop including first and second portions, means for opening said precession storage loop and closing each of said first and second portions on itself, a utilization circuit, and means for selectively coupling said reference and said precession storage loops to said utilization circuit.

2. In combination, a serial binary data handling circuit, program and control circuitry associated with said data handling circuit, reference and precession delay loops for storing binary digital information, means for exchanging information between said delay loops and said data handling circuit under the control of said program and control circuitry, said precession delay loop including first and second delay circuits, and means for shifting binary information in said precession loop with respect to that in said reference loop, said last-mentioned means including circuitry for breaking said precession delay loop and closing each of said delay circuits on itself to form two separate delay loops.

3. In a digital data processing system, a reference storage loop, a precession storage loop, each of said storage loops including a long acoustic delay circuit and a shorter electrical delay circuit, a data handling circuit, means coupled to said electrical delay circuits for interchanging binary information between said storage loops and said data handling circuit, and means for by-passing at least a portion of the electrical delay in said precession delay loop and for simultaneously closing that portion of the electrical delay upon itself to form an additional delay loop.

4. In combination, a serial binary data handling circuit, program and control circuitry associated with said data handling circuit, reference and precession delay loops for storing binary digital information, means for exchanging information between said delay loops and said data handling circuit under the control of said program and control circuitry, said precession delay loop including first and second delay circuits, and means for shifting binary information in said precession loop with respect to that in said reference loop, said last-mentioned means including circuitry for selectively breaking said precession delay loop and forming two separate delay loops each including one of said delay circuits.

5. In a digital data processing circuit, a first storage delay circuit, a second storage delay circuit, each said delay circuit having an input and an output, means for connecting said first and second delay circuits in series to form a first closed storage loop for the circulation of stored binary digital information around said first loop through said series connected circuits, and means for selectively opening said first storage loop and for connecting the output of each of said delay circuits to its own input to form individual second and third closed storage loops each including one of said delay circuits for the circulation of stored binary digital information around said individual second and third storage loops.

References Cited in the file of this patent

UNITED STATES PATENTS

| | | |
|---|---|---|
| 2,711,526 | Gloess | June 21, 1955 |
| 2,846,142 | Strachey | Aug. 5, 1958 |